United States Patent [19]

Reynolds

[11] 3,919,114

[45] *Nov. 11, 1975

[54] SYNTHESIS GAS PROCESS

[75] Inventor: Blake Reynolds, Riverside, Conn.

[73] Assignee: Texaco Development Corporation, New York, N.Y.

[ * ] Notice: The portion of the term of this patent subsequent to Mar. 27, 1990, has been disclaimed.

[22] Filed: Nov. 24, 1972

[21] Appl. No.: 309,316

Related U.S. Application Data

[63] Continuation-in-part of Ser. No. 878,725, Nov. 21, 1969, Pat. No. 3,723,344, and Ser. No. 878,728, Nov. 21, 1969, Pat. No. 3,723,345.

[52] U.S. Cl. ............................. 252/373; 423/655
[51] Int. Cl.$^2$ ................................. C07C 1/02
[58] Field of Search .................. 252/373; 423/655

[56] References Cited
UNITED STATES PATENTS

| | | | |
|---|---|---|---|
| 3,097,082 | 7/1963 | Guptill | 252/373 |
| 3,723,344 | 3/1973 | Reynolds | 252/373 |

*Primary Examiner*—Bernard Helfin
*Assistant Examiner*—A. Siegel
*Attorney, Agent, or Firm*—T. H. Whaley; C. G. Ries; Albert Brent

[57] ABSTRACT

This is a process for producing synthesis gas, fuel gas, or reducing gas while controlling the mole ratio ($CO/H_2$) of the product gas. Gaseous feed mixtures substantially comprising carbon monoxide and hydrogen and containing $CO_2$ and $H_2O$ are cooled and optionally purified to produce a process gas stream having a temperature of less than 1500°F. A gaseous mixture is then formed having a temperature above 1500°F. and comprising said process gas stream in admixture with a supplemental material selected from the group consisting of $H_2O$ and $CO_2$-rich gas. The gaseous mixture is reacted in a free-flow non-catalytic thermal water-gas shift conversion zone to produce a stream of product gas having a mole ratio ($CO/H_2$) which is greater than the mole ratio ($CO/H_2$) of said gaseous feed mixture when said supplemental gas is $CO_2$-rich gas, and a stream of product gas having a mole ratio ($CO/H_2$) which is less than the mole ratio ($CO/H_2$) of said gaseous feed mixture when said supplemental gas is $H_2O$.

9 Claims, No Drawings

SYNTHESIS GAS PROCESS

This application is a continuation-in-part of our application Ser. No. 878,725 filed Nov. 21, 1969 now U.S. Pat. No. 3,723,344, and application Ser. No. 878,728 filed Nov. 21, 1969 now U.S. Pat. No. 3,723,345.

BACKGROUND OF THE INVENTION

1. Field of Invention

This invention relates to a method for the production of synthesis gas, i.e. a mixture of carbon monoxide and hydrogen useful in the synthesis of organic compounds. In one specific embodiment of the invention synthesis gas is produced having a controlled mole ratio ($CO/H_2$) of about 1.0 or higher suitable as oxosynthesis gas. In an other embodiment, the product stream has a controlled mole ratio ($CO/H_2$) of about 0.5 to 1, and is suitable as methanol or Fischer-Tropsch synthesis gas.

2. Description of the Prior Art

Gaseous mixtures comprising principally hydrogen and carbon monoxide are referred to as synthesis gas and are commonly made by the partial oxidation of hydrocarbon fuels with oxygen at autogenous reaction temperatures. Such mixtures are useful as a source of feed gas for the synthesis of ammonia, hydrocarbons, and oxygen-containing organic compounds. Synthesis gas may be made by other processes such as steam reforming.

The mole ratio of $CO/H_2$ in synthesis gas mixtures made by the partial oxidation of a hydrocarbon with oxygen is primarily a function of the C/H ratio in the fuel. The introduction of steam, carbon dioxide or both as moderators in the reaction also has some effect on the $CO/H_2$ ratio of the synthesis gas so produced. However, only limited amounts of such moderators may be supplied to the reaction zone of a synthesis gas generator without excessive reduction of the autogenous reaction temperature or production of unwanted by-products.

Typically the product gas obtained by direct partial oxidation of liquid hydrocarbons contains approximately equal volumes of carbon monoxide and hydrogen. The relative proportions of hydrogen to carbon monoxide may be then increased by the catalytic water gas shift reaction. In the catalytic water-gas shift reaction, carbon monoxide is reacted with steam over a catalyst at a temperature in the range of about 400° to 1000°F. to produce hydrogen and carbon dioxide. This catalytic process is well known. An iron-chromium oxide catalyst is commonly used at the higher temperatures while a zinc oxide-copper oxide catalyst may be used at the lower temperatures. The need for such water-gas shift catalysts constitutes an economic disadvantage in prior art processes.

SUMMARY

A process for preparing gaseous mixtures comprising carbon monoxide and hydrogen while controlling the mole ratio ($CO/H_2$) of the product gas comprising 1. producing an effluent gas mixture comprising principally carbon monoxide and hydrogen by subjecting a hydrocarbon fuel to partial oxidation with a free-oxygen containing gas and optionally with a temperature moderator in a free-flow non-catalytic partial oxidation gas generating zone at an autogenous temperature in the range of about 1700° to 3500°F., and a pressure in the range of about 1 to 350 atmospheres, 2. cooling and optionally purifying the effluent gas mixture from (1) producing a gas mixture having a temperature of less than 1500°F., 3. combining the gas mixture from (2) with a supplemental material selected from the group consisting of $H_2O$ and $CO_2$-rich gas so as to produce a gas mixture having a temperature greater than 1500°F., and 4. reacting in a separate unpacked free-flow non-catalytic water-gas shift conversion zone at a temperature of at least 1500°F., the gas mixture from (3) to produce a product gas mixture comprising carbon monoxide and hydrogen having a mole ratio ($CO/H_2$) which is less than the effluent gas mixture in (1) when said supplemental material selected is $H_2O$, and having a mole ratio ($CO/H_2$) which is greater than the effluent gas mixture in (1) when said supplemental material selected is $CO_2$.

DESCRIPTION OF THE INVENTION

Crude synthesis gas, principally comprising a mixture of carbon monoxide and hydrogen with minor amounts of $H_2O$, $CO_2$, free carbon soot in the amount of about 0.01 to 3 weight percent (basis carbon in hydrocarbon fuel) is preferably produced by the partial oxidation of a hydrocarbon fuel with a free-oxygen containing gas selected from the group consisting of air, oxygen-enriched air (greater than 21 mole % $O_2$), and preferably relatively pure oxygen (95 mole % $O_2$ or higher). The atomic ratio of free (uncombined) oxygen to carbon in the hydrocarbon fuel feed (O/C ratio) is in the preferable range of about 0.80 to 1.5. The reaction time in the gas generator is about 2 to 6 seconds.

Substantially any low cost hydrocarbon fuel may be used as a feedstock for this process that produces in a partial oxidation synthesis gas generator a gas mixture comprising carbon monoxide and hydrogen in which the mole ratio $CO/H_2$ is in the range of about 0.3 to 2. For example, the hydrocarbon fuel charge stock to a synthesis gas generator may include by definition gaseous, liquid or solid hydrocarbonaceous fuels, or mixtures thereof. Suitable gaseous fuels include natural gas, refinery off-gas, acetylene tail gas, and by-products gas from the Fischer-Tropsch reaction. Suitable liquid hydrocarbon fuels for feeding into the synthesis gas generator cover the petroleum range from propane, naphtha and gas oils to fuel oils, reduced crude oils, and whole crude oils. Also included by definition are shale oil, tar-sand oil, coal tar, and slurries of solid carbonaceous fuels such as petroleum coke, oil shale, tar sands, coal and coke from coal in water or one of the aforementioned liquid hydrocarbon fuels.

The hydrocarbon fuel is partially oxidized in a refractory lined reaction zone of a free-flow synthesis gas generator at an autogenously maintained temperature within the range of about 1700° to 3500°F. and a pressure in the range of 1 to 350 atmospheres to produce a primary feedstream of synthesis gas. The synthesis gas generator preferably is a compact unpacked free-flow noncatalytic refractory-lined steel pressure vessel of the type described in U.S. Pat. No. 2,809,104 issued to D. M. Strasser et al. Preheating of the feedstream to the synthesis gas generator is optional, but generally desirable. For example, charge stocks of liquid hydrocarbon fuel and steam may be preheated to a temperature in the range of about 100° to 750°F. The introduction of a temperature moderator into the synthesis gas generator is optional and is dependent upon the type of hydrocarbon fuel employed. For example, generally no steam is required with gaseous hydrocarbon fuels, whereas from about 0.1 to 1 part by weight of steam is used per part by weight of liquid hydrocarbon fuel. Other suitable temperature moderators which may be used in place of or in combination with $H_2O$ include $CO_2$, a cooled portion of the product gas, cooled off-gas from an integrated ore-reduction zone, e.g. blast-furnace, various off gases from other processes, and inert gas, e.g. nitrogen, and mixtures thereof.

The reaction zone for this embodiment of the non-catalytic thermal reverse or direct water-gas shift reaction may preferably comprise a separate unpacked free-flow steel pressure vessel that is lined with a refractory material and preferably free of obstructions and preferably of suitable size to provide a residence time in the range of about 0.1 to 5 seconds. For example, reference is made to the spherical plenum chamber interconnecting a gas generator with a waste heat boiler as shown in coassigned U.S. Pat. No. 3,565,588. An elevated temperature is maintained in the water-gas shift reaction zone such that the water-gas shift reaction proceeds rapidly without a catalyst. However, the tubular heater upstream from the aforesaid separate free-flow steel pressure vessel may be considered part of the water-gas thermal shift reaction zone, since thermal direct or reverse non-catalytic water-gas shift reaction is initiated when the temperature of the reacting stream exceeds about 1500°F. When the word "adiabatic" is used herein with respect to the water-gas shift reaction, it means that apart from minor unavoidable heat loss through the walls of the reactor, there is substantially no exchange of heat with the surroundings.

The effluent gas from the synthesis gas generator leaves at a temperature in the range of about 1700° to 3500°F. and is cooled and optionally purified or otherwise processed during which time the temperature is reduced to below 1500°F. For example in one embodiment of the invention involving non-catalytic direct water-gas shift the effluent gas may be introduced directly into a quench tank containing hot water at the quench equilibrium temperature and cooled to a temperature in the range of about 400° to 650°F. Large quantities of steam are generated in the quench vessel and the quench chamber may be likened to a high output, high pressure boiler. A suitable quench tank is shown in coassigned U.S. Pat. No. 2,896,927 issued to R. E. Nagle et al. Advantageously, by such direct cooling a portion of the quench water is vaporized and forms the supplemental $H_2O$ which is mixed with the effluent synthesis gas. Supplemental $H_2O$ from an external source may also be added if required. Further, by such quenching particulate carbon soot in the effluent gas is washed out of the process gas stream by the quench water, forming a particulate carbon-water slurry.

Optionally, entrained soot particles may be scrubbed from the effluent gas by direct contact with quench water in other gas-liquid contact apparatus, e.g. venturi or jet contactor, bubble plate or packed column, or a combination of said equipment. Conventional venturi or jet contactors are described in Chemical Engineers' Handbook, Fourth Edition, ed. by J. H. Perry, N.V., McGraw-Hill Co., 1963, pages 18–55 to 56.

Alternately, the effluent gas from the gas generator may be cooled to a temperature below 1500°F. by indirect heat exchange. For example, by indirect heat exchange with water in waste-heat boiler steam may be produced. This steam may be used in the embodiment of the invention involving noncatalytic thermal direct water-gas shift. Additional cooling of the effluent synthesis gas takes place during scrubbing. For a detailed description of cooling synthesis gas by means of a waste heat boiler and a gas scrubbing tower reference is made to U.S. Pat. No. 2,980,523 issued to R. M. Dille et al.

The temperature of the effluent synthesis gas may also be reduced to below 1500°F. during conventional gas purification steps which may be included at this point in the process to remove any gaseous impurities such as $H_2S$, COS and $CO_2$. For example, optionally excessive carbon dioxide may be removed from the process gas stream for non-catalytic thermal direct water-gas shift by a suitable conventional regenerative solvent scrubbing process, e.g., monoethanolamine, hot carbonate. Such processes may also remove any $H_2S$ which may be present in the product gas stream. The $CO_2$ may be recycled as a portion of the supplemental $CO_2$-rich gas introduced into the water-gas reverse shift converter.

One further means for cooling the temperature of the effluent gas from the gas generator to a temperature below 1500°F is by mixing it with a supplemental stream of $CO_2$-rich gas or $H_2O$ from an external source.

The process gas stream which has been cooled to a temperature below 1500°F as previously described is heated preferably to a temperature above 1500°F and suitably in the range of 1500° to 2800°F prior to being subjected to non-catalytic thermal reverse or direct water-gas shift reaction. This heating is preferably done in a separate heater such as a heat exchanger or in an externally fired conventional tubular heater. Further, the supplemental $H_2O$ or $CO_2$-rich gas may be separately supplemental $H_2O$ or $CO_2$-rich gas may be separately introduced into the process gas stream before or after the heater. Alternately, a stream of supplemental $H_2O$ or $CO_2$-rich gas may be introduced into the non-catalytic thermal shift conversion zone where it mixes with a separately introduced stream of process gas reheated to a temperature above 1500°F so that the mixture of gases is at a temperature above 1500°F.

The supplemental $H_2O$ for the non-catalytic thermal direct water-gas shift reaction or the $CO_2$-rich gas containing $CO_2$ in the range of about 25 to 95 mole % or more for the non-catalytic thermal reverse water-gas shift reaction may be obtained from an external source or may be produced within the process, and may be about 500° to 1500°F.

In one embodiment of the invention, a gas mixture is produced having a temperature below 1500°F. by mixing supplemental $H_2O$ or $CO_2$-rich gas with a mixture comprising principally carbon monoxide and hydrogen. The gas mixture is then serially passed through an externally fired tubular heater where its temperature is increased to above 1500°F. and thermal shift reaction commences and then through a tubular non-catalytic thermal direct or reverse water-gas shift reactor which may be a continuation of the tubular heater where the thermal shift reaction is completed.

The amount of supplemental $H_2O$ added to the process gas stream prior to the non-catalytic thermal water-gas direct shift reaction must satisfy heat and material balances. The equilibrium constant ($K_D$) for the direct water-gas shift reaction is shown in equation (I) below. $K_D$ is a function of the reaction temperature and varies from 0.74 to 0.26 over a temperature range from 1700° to 2800°F.

$$K_p = \frac{(H_2) \times (CO)}{(CO) \times (H_2O)} \quad (1)$$

where: $(H_2)$, $(CO_2)$, $(CO)$ and $(H_2O)$ represent the mole fractions (or partial pressures) of the constituent enclosed by the parenthesis and $x$ represents a multiplying sign.

In the non-catalytic thermal water-gas direct shift reaction, a portion of the $H_2O$ in the water-gas shift feed stream is reduced to hydrogen while simultaneously a stoichiometric amount of carbon monoxide is oxidized to carbon dioxide. The net result of the direct water-gas shift reaction is to decrease the mole ratio $(CO/H_2)$ of the product gas leaving the water-gas shift converter. The residence time in the non-catalytic free-flow adiabatic water-gas shift converter is in the range of about 0.1 to 5 seconds at a temperature of at least 1500°F.

An elevated temperature is maintained in the water-gas shift reaction zone such that the adiabatic direct water-gas shift reaction proceeds rapidly without a catalyst.

Methanol synthesis gas having a mole ratio $(CO/H_2)$ of about 0.5 or lower and Fischer-Tropsch synthesis gas having a mole ratio $(CO/H_2)$ in the range of about 0.5 to 1.0 may be made by the process of my invention, providing the effluent synthesis gas from the synthesis gas generator has a correspondingly higher $CO/H_2$ ratio than the desired product gas, and direct water-gas shift is employed.

In another embodiment of my invention, a limited supplemental amount of free oxygen, preferably relatively pure oxygen (95 mole percent $O_2$ or higher), is introduced into the adiabatic non-catalytic direct water-gas shift conversion zone in an amount sufficient to maintain the temperature therein at least 1500°F. and preferably in the range of 1700° to 2800°F.

In still another embodiment of my invention, the water-gas shift feed stream is subjected to a plurality of steps of thermal direct water-gas shift reaction. Preferably, there are two successive steps of thermal shift. In this embodiment of the invention the first water-gas shift reaction is performed in a non-catalytic adiabatic reactor, supplemental $H_2O$ is mixed with the shifted gas, and the gaseous mixture is then subjected to further shifting in a second non-catalytic thermal direct water-gas shift reactor in the manner previously described for the first thermal water-gas shift reaction. Multi-shift operation is recommended for specific instances where a product gas with a desired composition cannot be easily made by the single non-catalytic thermal shift process. Further, if the temperature of the water-gas shift feed gas is too low for the second non-catalytic shift reaction, a limited supplemental amount of free-oxygen, preferably relatively pure oxygen (95 mole % $O_2$ or higher), may be introduced into the second non-catalytic thermal shift converter either directly or in admixture with supplemental steam. In such case, a portion of the $H_2$ and CO in the shift feed gas mixture reacts with said supplemental free-oxygen in the second non-catalytic water-gas direct shift conversion zone so as to raise the temperature in the second shift reaction zone to at least 1500°F. and preferably to a temperature in the range of 1700° to 2800°F.

The amount of supplemental $CO_2$ added to the process gas stream prior to the noncatalytic thermal reverse water-gas shift reaction must be sufficient to satisfy heat and material balances. The equilibrium constant ($K_R$) for the water-gas reverse shift reaction as shown in equation (II) below is a function of the reaction temperature and varies from 1.36 to 3.85 over a temperature range of 1700° to 2800°F.

$$K_R = \frac{(CO) \times (H_2O)}{(H_2) \times (CO_2)} \quad (II)$$

where: $(H_2)$, $(CO_2)$, $(CO)$ and $(H_2O)$ represent the mole fractions (or partial pressures) of the constituent enclosed by the parenthesis and x represents a multiplying sign.

The supplemental $CO_2$-rich gas stream may be a gas mixture comprising $CO_2$, $H_2$ and $H_2O$, said gas mixture preferably having at least 25 mole % of $CO_2$. In one specific embodiment of this invention, a stream of $CO_2$ containing at least 95 mole % $CO_2$ is recovered as a by-product from the water-gas direct shift reaction between steam and hot synthesis gas, which simultaneously produces a stream of methanol synthesis feed gas having a mole ratio $(CO/H_2O)$ of about 0.5 or lower. Such a process is described in greater detail in Example 1 below.

In the noncatalytic thermal reverse water-gas shift reaction, a portion of the carbon dioxide is reduced to carbon monoxide while simultaneously a stoichiometric amount of hydrogen is oxidized to water. The net result of the water-gas reverse shift reaction is to increase the mole ratio $(CO/H_2)$ of the product gas leaving the water-gas reverse shift converter. The residence time in the non-catalytic free-flow adiabatic water-gas reverse shift converter is in the range of about 0.1 to 6 second at a temperature of at least 1500°F. and preferably for about 0.1 to 2 seconds at a temperature in the range of about 1700° to 2800°F. and at a pressure in the range of about 1 to 350 atmospheres. Multi-shift operation along with the introduction a small amount of oxygen into the non-catalytic thermal reverse water-gas shift converter for temperature control may also be used in connection with the embodiment of the process involving non-catalytic thermal reverse water-gas shift reaction.

The gases leave the noncatalytic reverse or direct water-gas shift converter at a temperature in excess of about 1500°F. and may be optionally cooled to a temperature in the range of about 400° to 800°F. Cooling may be effected by indirect heat exchange in a cooling zone such as a waste heat boiler. Alternately, cooling may be effected by direct heat exchange in a quench water tank of conventional design, as previously described. The steam produced in the waste heat boiler may be used economically elsewhere in the process or may be exported.

Also optionally, entrained solid particles may be scrubbed from the cooled shifted effluent gas leaving the waste heat boiler by direct contact with quench water in a gas-liquid contact apparatus, for example, a quench tank, a spray tower, venturi or jet contactor, bubble plate or packed column, or a combination of said equipment as previously described. Further, the $CO_2$ may be recovered and recycled as a portion of the supplemental $CO_2$ introduced into the reverse water-gas shift converter.

Oxo-synthesis gas having a mole ratio $(CO/H_2)$ of about 1.0 or higher may be made by the process of my invention, providing the effluent gas from the synthesis gas generator has a correspondingly lower ($CO/H_2$) mole ratio than the desired product gas, and reverse shift is employed.

In another embodiment of my invention, a limited supplemental amount of free-oxygen, preferably relatively pure oxygen (95 mole % $O_2$ or higher), is introduced into the adiabatic non-catalytic reverse water-gas shift conversion zones in an amount sufficient to maintain the temperature therein at least 1500°F. and preferably in the range of 1700° to 2800°F.

In still another embodiment of my invention involving multi-shift operation, the water-gas shift feedstream is subjected to a plurality of and preferably two successive steps of reverse water-gas shift reaction. The first reverse water-gas shift reaction is performed in a non-catalytic adiabatic reverse water-gas shift reactor, and the shifted gas is then subjected to further shifting in a second non-catalytic reverse water-gas shift reactor, in the manner previously described for the first shift reaction. Supplemental $CO_2$ - rich stream is introduced into the first shift reactor, and also into the second shift reactor along with the shift feedstream. Multi-shift operation is recommended for specific instances where a product gas with a desired composition cannot be easily made by the single direct or reverse shift process. If the temperature of the water-gas shift feed gas is too low for the first or second shift reaction, or both, a limited supplemental amound of free oxygen, preferably pure oxygen (95 mole % $O_2$ or higher) may be introduced into one or both non-catalytic thermal shift reactors in admixture with said supplemental $CO_2$. In such case, a portion of the $H_2$ and CO in the shift feed gas mixture reacts with said supplemental free oxygen so as to raise the temperature in the non-catalytic shift converter to at least 1500°F. and preferably to a temperature in the range of 1700° to 2800°F.

In another embodiment of the subject invention, a portion of the oxo-synthesis gas made by reverse thermal shift as previously described and a portion of the methanol synthesis gas made by direct thermal shift as previously described may be blended to produce a synthesis gas stream of intermediate composition.

While the aforesaid description of the process was based on producing mixtures of CO and $H_2$ of specific mole ratios ($CO/H_2$) from synthesis gas made preferally by the partial oxidation of hydrocarbon fuels, other gaseous mixtures of CO and $H_2$ made by other processes and having a temperature of less than 1500°F. for example, the catalytic steam reforming of hydrocarbons, may be heated to a temperature above 1500°F. and subjected to non-catalytic thermal water-gas direct and reverse shift reaction in the manner described previously.

Some advantages and improvements of the subject process over prior art catalytic water-gas shift conversion processes follows:

1. Elimination of high cost, easily deactivated catalysts and expensive shift converters. Elimination of costly downtime required to replace spent catalyst.

2. Low cost high sulfur bearing fuels may be used as feedstock in the gas generator to produce the feed gas.

3. No unusual pressure drop in the system, whereas catalyst beds incur significant pressure drops.

4. Optionally, water-gas shifting of the effluent gas from a synthesis gas generator may be effected without costly removal of entrained particulate carbon soot.

5. The process is self-contained in that required supplemental $H_2O$ or $CO_2$ may be produced in the system.

EXAMPLES OF THE PREFERRED EMBODIMENTS

The following examples are offered as a better understanding of the present invention but the invention is not to be construed as limited thereto.

EXAMPLE I

This example describes an embodiment of the process of my invention as applied to the manufacture of methanol or Fischer-Tropsch synthesis gas from a petroleum vacuum tower residuum whereby non-catalytic free-flow direct water-gas multi-shift conversion and the addition of supplementary oxygen to the shift converter are employed.

4200 pounds per hour of vacuum residuum at a temperature of 750°F. are reacted in a partial oxidation synthesis gas generator with 133.2 moles per hour of pure oxygen in a stream of 99 mole % $O_2$ at a temperature of 300°F. and 116.5 moles per hour of steam at a temperature of 750°F. The vacuum residuum has an API gravity of 4.5°, a gross heating value of 17,500 BTU per pound, and the following ultimate analysis in weight %: C 85.8, $H_2$ 9.1, S 5, and ash 0.1.

The effluent gas from the synthesis gas generator i.e. about 605 moles per hour at a temperature of about 2500°F. and a pressure of about 500 psig, has the composition shown in Table I, Column 2. Also entrained in this process gas stream is 2.0 weight % of free carbon soot (basis carbon in liquid hydrocarbon fuel). The effluent gas is quenched in quench water maintained at a temperature of about 410°F. and a pressure of 500 psig.

700 moles per hour of steam are vaporized into the process gas stream and are replaced by the addition to the quench tank of 25 gallons per minute of fresh water at quench temperature. The process gas stream leaves the quench zone at a temperature of 410°F., a pressure of 500 psig, and a steam/dry gas mole ratio of 1.40. The entrained free carbon soot in the quenched process gas stream is about 0.4 weight %.

The process gas stream is then introduced into a conventional gas scrubbing zone where substantially all of the remaining free-carbon soot is removed. The temperature of the process gas stream, which at this point of the process has been reduced to about 400°F. with a steam to dry gas ratio of about 1.38, and a composition (dry basis) as shown in Table I, Column 3, is next increased to 1800°F. by means of an externally fired heater. The mixture is immediately introduced into a first non-catalytic free-flow adiabatic direct water-gas shift converter where the $H_2O$ in the gas stream reacts with the CO therein to produce additional $H_2$ and $CO_2$. The gas composition of the gas leaving the first non-catalytic direct shift conversion zone is shown in Table I.

663 moles per hour of dry shifted effluent synthesis gas leave the first non-catalytic direct water-gas shift converter at a temperature of about 1830°F. and a pressure of about 490 psig. This shifted effluent gas has a mole ratio ($CO/H_2$) of 0.44 which represents a 63% reduction of the $CO/H_2$ mole ratio of the effluent gas from the synthesis gas generator. It is suitable for use as methanol synthesis gas. Further, it may be used as feed gas to a second non-catalytic thermal water-gas shift conversion zone, as described below, where the ($CO/H_2$) mole ratio is further adjusted.

An analysis of the shifted effluent gas (on the dry basis) leaving the first non-catalytic thermal water-gas shift conversion zone is shown in Table I, Column 4.

50 moles per hour of supplemental steam at a temperature of 900°F. are mixed with 1293 moles per hour of wet shifted effluent gas from the first non-catalytic direct water-gas shift conversion zone. The gas mixture is then introduced into a second non-catalytic adiabatic free-flow direct water-gas shift conversion zone. The water-gas shift reaction takes place to produce additional $H_2$ and to convert CO to $CO_2$. The composition of the product gas leaving the second non-catalytic direct water-gas shift converter is shown in Table I, Column 5. The mole ratio ($CO/H_2$) of 0.38 for the product gas marks a reduction of 68% of the effluent gas from the synthesis gas generator. The product gas may be used for Fischer-Tropsch Synthesis.

The product gas leaves at a pressure of about 480 psig. This pressure is substantially the same as that of the effluent gas from the synthesis gas generator, less the ordinary line drop. A substantial economic savings is therefore achieved since the product gas may be made available at high pressures without requiring a subsequent compression step in a costly gas compressor.

ent stream of synthesis gas. 491.9 moles per hour of effluent synthesis gas leave the gas generator at a temperature of 2600°F., and a pressure of 500 psig and having a mole ratio ($CO/H_2$) of 0.57. The composition of the effluent synthesis gas from the gas generator is shown in Table II, Stream No. 1. Also entrained in the effluent gas is about 0.05 weight % of free carbon soot (basis carbon in the refinery gas feed).

The effluent synthesis gas from the gas generator is passed through a waste-heat boiler and then scrubbed with oil. Substantially all of the particular carbon soot is thereby removed and the temperature of the gas is reduced to about 700°F. About 115.7 moles per hour of supplemental carbon dioxide from an external source are then mixed with the effluent synthesis gas heated by means of a conventional externally fired tubular heater to a temperature of 1800°F. and introduced into a free-flow non-catalytic thermal reverse water-gas shift converter. A portion of the $CO_2$ in the process gas stream reacts with a portion of the $H_2$ in the process gas stream thereby producing a product gas stream of 607.6 moles per hour having the composition shown in Table II, Stream No. 2.

Thus, by means of the subject invention the mole ratio ($CO/H_2$) of the effluent synthesis gas stream is increased from 0.57 to 1.00 and is now a suitable feedstock for oxo-synthesis.

TABLE I - GAS ANALYSIS

| Composition Mole % | Effluent Syn Gas From Generator | Exit Gas From Scrubbing Zone Dry Basis | Exit Gas From First Non-Catalytic Direct Shift Conversion Zone Dry Basis | Exit Gas From Second Non-Catalytic Direct Shift Conversion Zone Dry Basis |
|---|---|---|---|---|
| CO | 45.6 | 50.8 | 23.5 | 20.8 |
| $H_2$ | 39.0 | 43.4 | 53.7 | 54.7 |
| $CO_2$ | 3.7 | 4.14 | 21.44 | 23.16 |
| $H_2O$ | 10.2 | — | — | — |
| $CH_4$ | 0.21 | 0.23 | 0.19 | 0.19 |
| A | 0.22 | 0.24 | 0.20 | 0.20 |
| $H_2S$ | 1.0 | 1.11 | 0.91 | 0.89 |
| COS | 0.07 | 0.08 | 0.06 | 0.06 |
|  | 100.00 | 100.00 | 100.00 | 100.00 |
| Moles per hour | 605 | 543 | 663 | 678 |
| $CO/H_2$ mole ratio | 1.2 |  | 0.44 | 0.38 |
| Steam/dry gas mole ratio | 0.11 | 1.38 | 0.95 | 0.98 |

EXAMPLE II

This example illustrates an embodiment of the process of my invention as applied to the manufacture of oxosynthesis from a petroleum refinery off-gas. Non-catalytic free-flow reverse water-gas shift conversion is employed.

159.6 moles per hour of Petroleum Refinery Gas at a temperature of 1000°F and a pressure of 550 pounds per square inch gauge (psig) and having the following composition are introduced into a conventional partial Oxidation Synthesis Gas Generator.

| Hydrogen | 18 | Mole Percent |
|---|---|---|
| Methane | 60 | do. |
| Ethylene | 2 | do. |
| Ethane | 19 | do. |
| Propane | 1 | do. |

105.6 moles per hour of pure oxygen in a stream of 95 mole % purity at a temperature of 300°F. and a pressure of 550 psig are reacted by partial oxidation with said Refinery Gas in said generator to produce an efflu-

TABLE II - GAS ANALYSIS

| | STREAM NUMBER | |
|---|---|---|
| Component Mole % | 1 | 2 |
| CO | 32.4 | 36.2 |
| $H_2$ | 56.9 | 36.2 |
| $CO_2$ | 1.3 | 10.3 |
| $H_2O$ | 7.9 | 16.3 |
| $CH_4$ | 0.38 | 0.30 |
| A | 0.78 | 0.63 |
| $N_2$ | 0.34 | 0.27 |
| | 100.00 | 100.00 |
| $CO/H_2$ mole ratio | 0.57 | 1.00 |

The process of the invention has been described generally and by examples with reference to materials of particular compositions for purposes of clarity and illustration only. It will be apparent to those skilled in the art from the foregoing that various modifications of the

I claim:

1. A process for producing gaseous mixtures comprising carbon monoxide and hydrogen while controlling the mole ratio ($CO/H_2$) of the product gas comprising
   1. producing an effluent gas mixture comprising principally carbon monoxide and hydrogen by subjecting a hydrocarbon fuel to partial oxidation with a free-oxygen containing gas and optionally with a temperature moderator selected from the group consisting of $H_2O$, $CO_2$, a cooled portion of the product gas, cooled off-gas from an integrated ore reduction zone, nitrogen, and mixtures thereof in a free-flow noncatalytic partial oxidation gas generating zone at an autogenous temperature in the range of about 1700° to 3500°F., and a pressure in the range of about 1 to 350 atmospheres,
   2. cooling and mixing the gas mixture from (1) with a supplemental material selected from the group consisting of $H_2O$ and $CO_2$ so as to produce a gas mixture having a temperature less than 1500°F.,
   3. increasing the temperature of the gas mixture from (2) to at least 1500°F., and
   4. reacting in a separate unpacked free-flow noncatalytic water-gas shift conversion zone at a temperature of at least 1500°F., the gas mixture from (3) to produce a product gas mixture comprising carbon monoxide and hydrogen having a mole ratio ($CO/H_2$) which is less than the effluent gas mixture from (1) when said supplemental material selected in (2) is $H_2O$, and having a mole ratio ($CO/H_2$) which is greater than the effluent gas mixture from (1) when said supplemental material selected in (2) is $CO_2$.

2. The process of claim 1 with the added step of introducing supplemental oxygen into said non-catalytic water-gas shift conversion zone in an amount sufficient to maintain the reaction temperature in said shift conversion zone at a temperature of at least 1700°F.

3. The process of claim 1 with the added steps of reacting in a second separate free-flow non-catalytic water-gas shift conversion zone at a temperature of at least 1500°F., the product gas mixture from step (4) in admixture with a supplemental material selected from the group consisting of $H_2O$ and $CO_2$ to produce a product gas mixture comprising carbon monoxide and hydrogen having a mole ratio ($CO/H_2$) which is less than the product gas mixture from step (4) when said supplemental material selected is $H_2O$, and having a mole ratio ($CO/H_2$) which is greater than the product gas mixture from step (4) when said supplemental material selected is $CO_2$.

4. The process of claim 3 with the added step of introducing supplemental oxygen into said second non-catalytic water-gas shift conversion zone in an amount sufficient to maintain the reaction temperature in said shift conversion zone at a temperature of at least 1700°F.

5. The process of claim 1 wherein said feed gas mixture is cooled in step 2 by direct quenching in hot water thereby vaporizing $H_2O$ into the process gas stream and producing at least a portion of the supplemental $H_2O$ in step (2).

6. The process of claim 1 wherein said feed gas mixture is cooled by indirect heat exchange with water in a waste-heat boiler thereby producing at least a portion of the supplemental $H_2O$ in step (2).

7. The process of claim 1 wherein said $CO_2$ is supplied as a $CO_2$-rich gas comprising 25 to 95 mole % or more of $CO_2$.

8. A continuous process for decreasing the mole ratio ($CO/H_2$) of a feed gas mixture comprising $H_2$, $CO$, $CO_2$ and $H_2O$ comprising
   1. mixing said feed gas mixture with supplemental $H_2O$ so as to produce a gaseous mixture having a temperature less than 1500°F.;
   2. increasing the temperature of the gaseous mixture from (1) to at least 1500°F; and
   3. reacting in an unpacked free-flow non-catalytic direct water-gas shift conversion zone at a temperature of at least 1500°F., the gaseous mixture from (2) to produce a product gas mixture comprising $H_2$, $CO$, $CO_2$ and $H_2O$ having a mole ratio ($CO/H_2$) which is less than that of said feed gas mixture.

9. A continuous process for increasing the mole ratio ($CO/H_2$) of a feed gas mixture comprising $H_2$, $CO$, $CO_2$ and $H_2O$ comprising
   1. mixing said feed gas mixture with supplemental $CO_2$ so as to produce a gaseous mixture having a temperature less than 1500°F;
   2. increasing the temperature of the gaseous mixture from (1) to at least 1500°F; and
   3. reacting in an unpacked free-flow non-catalytic reverse water-gas shift conversion zone at a temperature of at least 1500°F., the gaseous mixture from (2) to produce a product gas mixture comprising $H_2$, $CO$, $CO_2$ and $H_2O$ having a mole ratio ($CO/H_2$) which is greater than that of said feed gas mixture.

* * * * *